United States Patent [19]

Ibey

[11] Patent Number: 5,921,737
[45] Date of Patent: Jul. 13, 1999

[54] SPACER FOR AN ELECTRICAL MOUNTING BRACKET

[76] Inventor: Jerry A. Ibey, P.O. Box 9106, Whittier, Calif. 90608

[21] Appl. No.: 09/109,978

[22] Filed: Jul. 2, 1998

[51] Int. Cl.$^6$ .............................. F16B 43/00; F16B 43/02
[52] U.S. Cl. ............................................ 411/535; 411/546
[58] Field of Search ................................... 411/3, 5, 437, 411/531, 535, 536, 546, 547

[56] References Cited

U.S. PATENT DOCUMENTS

| | | | |
|---|---|---|---|
| 3,285,568 | 11/1966 | Biach | 411/535 X |
| 4,747,737 | 5/1988 | Roffelsen | 411/546 X |
| 4,909,692 | 3/1990 | Hendren | 411/546 X |
| 4,948,317 | 8/1990 | Marinaro | 411/535 |
| 5,015,132 | 5/1991 | Turner et al. | 411/5 X |

FOREIGN PATENT DOCUMENTS 675622  10/1990  Switzerland ........................... 411/546

Primary Examiner—Neill Wilson
Attorney, Agent, or Firm—Chris Papageorge

[57] ABSTRACT

A spacer for filling the gap between an electrical mounting bracket and an electrical mounting plate of an electrical junction box and thereby enabling the bracket to be securely screwed onto the plate is dimensioned to fit between the outer ends of the bracket and the plate. The spacer includes protruding members and receptacles which are located at corresponding end portions of opposite faces thereof and which enable a plurality of spacers to be positioned on one another in a face to face relationship with the protruding members fitting into the receptacles so as to form a solid stack. Selection of the number of spacers in the stack enables the thickness of the stack to be adjusted and thereby accomodate various widths of gaps between the outer ends of the bracket and the plate. The spacer also has a centrally located hole for the mounting screw. The hole is laterally elongated to allow the screw to pass through and secure the mounting bracket to the mounting plate anywhere in the width range of the hole and thus allow the position of the spacer relative to the mounting bracket and plate to be laterally adjusted. A pair of tabs within the hole engage the screw and function to retain the screw in the hole.

20 Claims, 3 Drawing Sheets

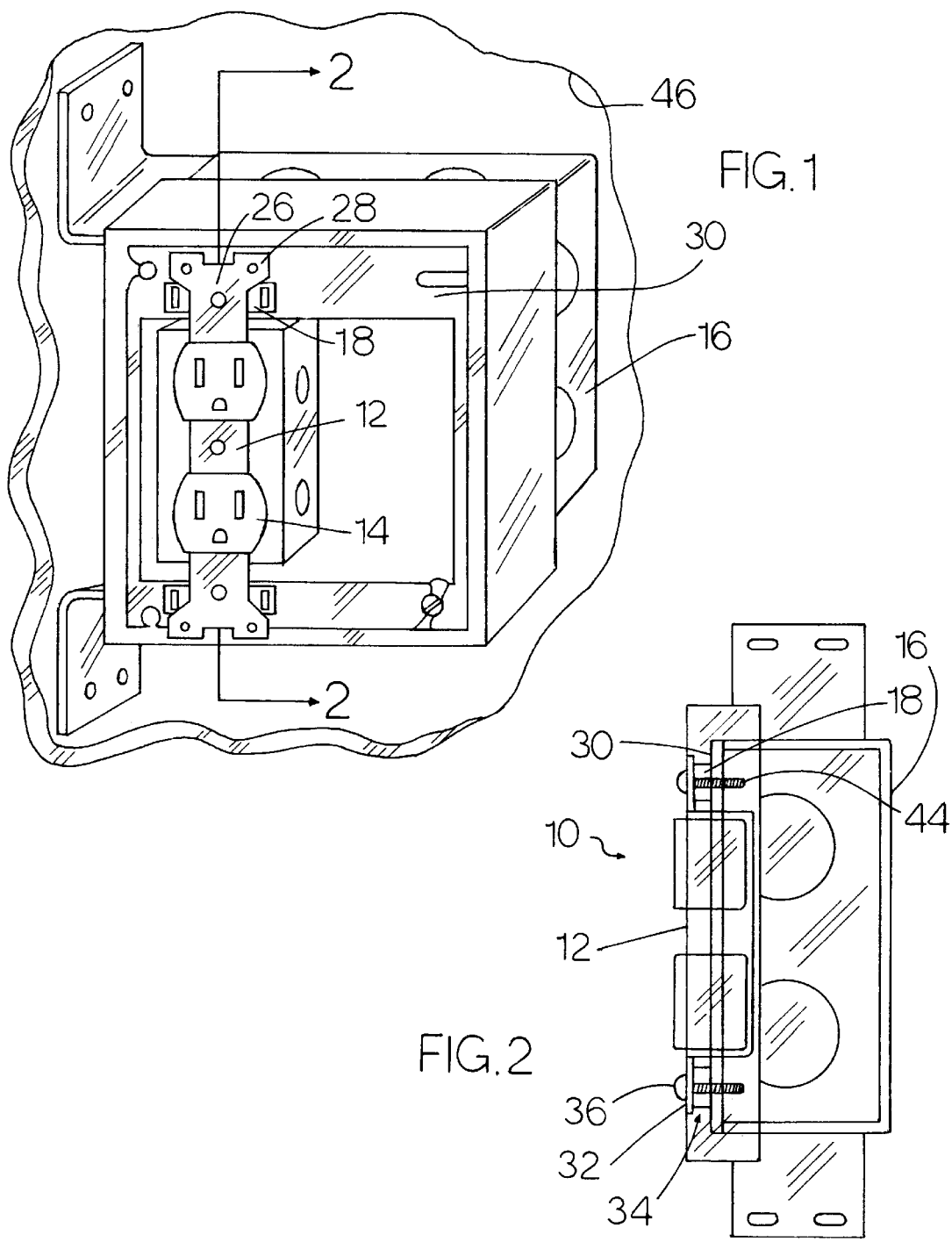

SPACER FOR AN ELECTRICAL MOUNTING BRACKET

BACKGROUND OF THE INVENTION

The invention relates generally to mounting structures for electrical devices such as switches, outlets and the like and, more particularly, to structures which facilitate the mounting of electrical mounting brackets, which hold electrical devices such as electrical switches or outlets, onto an electrical junction or wiring box which is attached to a recessed portion of a wall. The invention specifically provides a means for enabling an electrical mounting bracket to be securely screwed onto an electrical plate of the electrical box by filling the gap between the mounting ears of the bracket and the plate.

The electrical wiring in buildings is typically placed in conduits located within the walls of the building and terminates in electrical junction (or electrical wiring) boxes which are typically mounted within the walls such that the boxes extend inwardly from the drywall sheet portion of the wall to the central portion of the wall at holes cut in the drywall sheet thereof. The electrical junction box is attached to the central portion of the wall and the electrical mounting bracket holding the electrical device is usually screwed onto or otherwise attached to the drywall sheet at the edges of the hole. Oftentimes, however, the mooring for the electrical box is recessed excessively from the drywall or the drywall is routed out excessively so that the hole for the electrical box is oversize leaving insufficient drywall at the outer perimeter of the box to provide backing support to the electrical mounting bracket. Consequently, when the mounting bracket is positioned over the junction box, the ears of the bracket do not engage the drywall surface. In such instances, the ears of the bracket may be screwed directly onto the box to mounting members specifically provided for this purpose. However, in this type of mounting method, the wall switch, electrical outlet or other such electrical device attached to the mounting bracket cannot ordinarily be mounted flush with the drywall outer surface. But, flush mounting of the electrical device is desirable not only to provide easy access to the electrical device but also to provide a more aesthetic appearance when the drywall exterior surface is finished. Consequently, the worker performing the mounting task may attempt to accomplish the flush mount as best as the worker knows how. Frequently, however, the worker may simply use whatever materials are conveniently at hand to accomplish the adaptation (of the mounting bracket to the mismatched hole) to the improper match of the hole to the mounting bracket as quickly as possible. However, if this is not properly done, the adaptation may be either unstable or may not last very long. This task often necessitates an inordinate consumption of time and labor and unduly delays the completion of the main job or primary project, and this delay alone may be very costly.

In an effort to facilitate mounting of an electrical device onto an electrical junction box, spacers have been designed to be positioned between the mounting structures of the device and the junction box thereby filling the gap therebetween. One of these spacers is disclosed in U.S. Pat. No. 4,909,692 to Hendren. The Hendren spacer has an axially located aperture which receives a mounting screw therein for allowing the mounting bracket and electrical device to be screwed onto the junction box. The Hendren spacer is also provided with tabs which enable it to be broken apart thereby enabling adjustment of the height or thickness thereof to accomodate a range of widths of the gap between the mounting bracket and junction box. However, a primary disadvantage of the Hendren spacer is that is requires cutting or otherwise manually breaking the tabs to reduce the thickness of the spacer to that desired. But, this cutting or breaking may be awkward to perform under some circumstances or more time consuming than desired. In addition, such cutting or breaking is required except when utilizing a maximal thickness of the spacer. In addition, the aperture for the mounting screw is not dimensioned to allow lateral adjustment of the spacer relative to the screw. Thus, the Hendren spacer does not allow the spacer to be positioned so that it accomodates mating surfaces and structures of the mounting bracket and junction box and thus may not provide an adequately stable and firm attachment of the spacer to the mounting bracket and junction box.

Another prior art spacer for filling the gap between the mounting bracket and junction box is disclosed in U.S. Pat. No. 5,108,243 to Antonucci. The Antonucci spacer is somewhat similar to the Hendren spacer in that it has a centrally located aperture for the mounting screw to pass through in order to allow the mounting bracket to be screwed onto the junction box while the spacer is positioned therebetween. In addition, the Antonucci spacer is somewhat similar to the Hendren spacer in that it is essentially a large plurality of spacers joined together. But, the Antonucci spacer comprises individual spacers which are joined together at the lateral edges thereof so that the collective spacer can be folded together. Nevertheless, the Antonucci spacer design requires that the collective spacer be cut at the lateral edges thereof in order to reduce the collective spacers used to the desired number. However, a disadvantage with such a spacer design is that a suitable cutting tool for adjusting the spacer thickness may not be available. In addition, as with the Hendren spacer design, this required method of adjusting the spacer thickness may be awkward, inconvenient or unduly time consuming. In addition, since the Antonucci spacer is composed entirely of plastic which must be bent in order for the spacer to be folded together, the collective spacer when folded together has a certain springy characteristic which may be undesirable in some applications. Moreover, the top and bottom individual spacers are connected to the remainder of the spacers only at one lateral edge and this may also make the folded together spacer unstable because all the individual spacers are not interconnected at opposite ends thereof. In addition, as with the Hendren spacer, the aperture for the mounting screw is not dimensioned to allow lateral adjustment of the spacer relative to the screw. Thus, this design does not allow the spacer to be positioned so that it accomodates mating surfaces and structures of the mounting bracket and junction box and thus may not provide an adequately stable and firm attachment of the spacer to the mounting bracket and junction box.

An improved spacer is thus needed that is specifically designed to enable lateral adjustment of the positioning thereof relative to the mounting bracket and junction box in order to accomodate the shapes and structures of the mating surfaces thereof and thereby provide a more firm and stable interconnection. An improved spacer is also needed that allows quick and easy adjustment, without requiring the use of any cutting tools or the like, of the total thickness thereof in order to accomodate a range of width dimensions of the gap between the mounting bracket and junction box. An improved collective spacer composed of individual stacked together spacers is also needed which is firm and stable as a unit.

SUMMARY OF THE INVENTION

It is a principal object of the present invention to provide a spacer for positioning between the mounting ears of an electrical mounting bracket and the mounting plate of an electrical junction box in order to fill the gap therebetween to enable the mounting bracket to be properly mounted thereon.

It is also an object of the present invention to provide a spacer which may be used either individually or collectively when individual spacers are stacked together in order to adjust the thickness thereof to accomodate gaps of varying widths.

It is also an object of the present invention to provide a spacer enabling adjustment of the position thereof relative to the electrical mounting bracket and junction box when mounted therebetween.

It is another object of the present invention to provide a spacer which may be used either individually or collectively without cutting, breaking or other type of structural alteration thereof.

It is an object of the present invention to provide a spacer which is stable and firm when used as a collective unit.

It is an object of the present invention to provide a spacer which is provided with a hole for receiving a mounting screw therethrough thereby enabling the spacer to be securely held in place between the mounting bracket and junction box when mounted therebetween.

It is an object of the present invention to provide a spacer which is composed of insulating material so that it does not interfere with electrical wiring or electrical devices associated with the mounting bracket or junction box.

The spacer of the present invention is specifically designed to correct the problem which arises when due to worker oversight or mistake the electrical mounting bracket cannot be properly positioned so that it is both flush with the drywall outer surface and in contact with the electrical mounting plate of the electrical junction box. In such instances, when the bracket and electrical device thereof is placed in the desired position of being flush with the drywall outer surface there is a gap between the mounting ears of the mounting bracket and the corresponding mounting portions of the mounting plate of the junction box which prevents the bracket from being properly secured onto the plate. The spacer of the present invention is specifically designed to be positioned between the mounting ears of an electrical mounting bracket (which holds an electrical device such as an outlet or switch) and the corresponding end portions of an electrical mounting plate of an electrical junction box and thereby fill the gap. This enables the bracket to be firmly positioned against the plate of the junction box via the spacer which functions as an interface between the bracket and the plate. The spacer thus enables the bracket and electrical device thereof to be mounted so that they are generally flush with the drywall outer surface.

The mounting spacer of the present invention includes a planar member having a centrally located hole, a pair of posts on one face thereof and a pair of receptacles on an opposite face thereof. The posts (or protruding members) project outwardly from the planar member face and each has a centerline perpendicular to the planar member. The receptacles extend inwardly from the planar member face and each also has a centerline perpendicular to the planar member. The posts are located at opposite faces of the same portions of the planar member as the receptacles, and the centerlines of the posts are in alignment with the centerlines of the corresponding receptacles. The posts and receptacles are dimensioned so that the receptacles are slightly larger than the posts. This dimensioning in conjunction with the alignment enables a plurality of planar members to be joined together in a face to face arrangement with the posts of one snugly fitting into the receptacles of another thereby retaining the planar members in the desired stack arrangement. Thus, a plurality of planar members i.e., individual spacers, may be joined together so that they form a stack of individual spacers. The collective stack may be formed by simply manually positioning the front face of one individual spacer against the back face of another individual spacer and firmly pressing the spacers together until the posts of one snugly fit into the receptacles of another. The snug fit of these members and their location at opposite ends of the spacers provides a stack which is securely held together and thus stable and firm preventing individual spacers from being squeezed out of the sides of the stack or otherwise popping out of the sides of the stack under the compressive forces of securement via the mounting screw. The number of individual spacers in the collective stack may be adjusted to adjust the thickness of the stack and thereby accomodate various gap widths.

The planar member hole is centrally located and extends through the front and back faces of the planar member. The hole is dimensioned so that it is large enough to receive the mounting screw (of a size typically used in such applications) which is used to screw the mounting bracket onto the mounting plate of the junction box. Thus, when properly positioned between the mounting bracket and junction box, the hole enables the spacer to be in effect clamped between the bracket and box and thus firmly secured in the desired position by use of the mounting screw. The hole is also laterally elongated so that the mounting screw may be placed at any desired location in the hole within the lateral dimensions of the hole. This elongation feature allows compensation for a mismatch between the position of the box in the wall and the desired position of the mounting bracket in the drywall. This also allows the mounting bracket and/or spacer to avoid being placed on protruding structures on the mounting plate or on other structures in the junction box which are proximal to the mounting point of the junction box which would otherwise hinder proper securement of the mounting bracket. When in a stack arrangement, the holes of each of the individual spacers comprising the stack are in alignment with each other allowing the mounting screw to pass through the entire stack and enable firm securement of the entire stack onto the junction box and also enabling lateral adjustment of the position of the entire stack, as with the individual spacer.

BRIEF DESCRIPTION OF THE DRAWINGS

FIG. 1 is a perspective view of the spacer of the invention in use on a junction box mounted on a wall within a hole in the drywall.

FIG. 2 is a cross-sectional view of the spacer of the invention also shown in use on a junction box taken along line 2—2 of FIG. 1.

DETAILED DESCRIPTION OF THE PREFERRED EMBODIMENT

Figure 3:
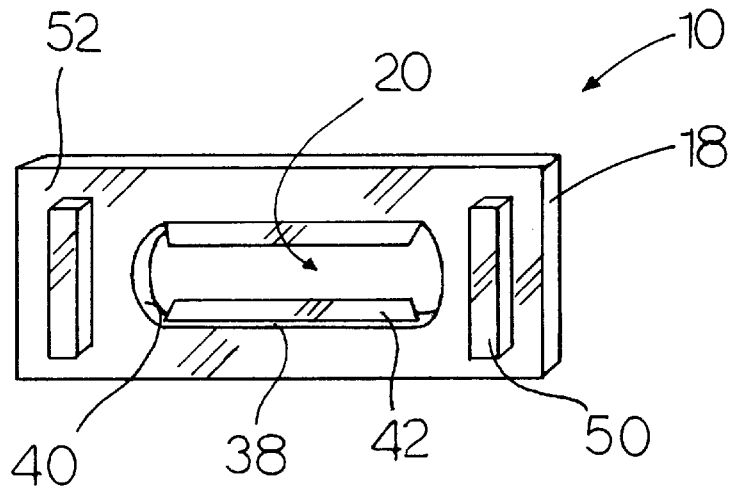
FIG. 3 is a perspective view of the spacer of the invention.
Figure 4:
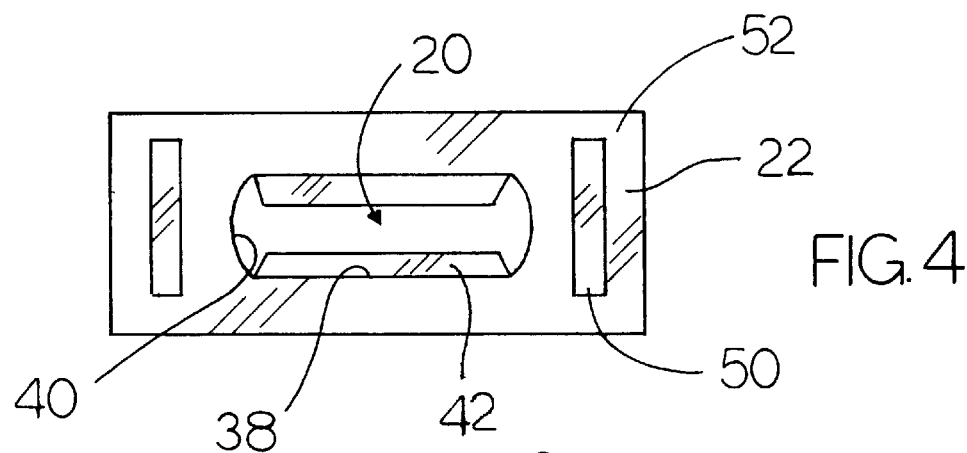
FIG. 4 is a front elevation view of the spacer of the invention.
Figure 5:
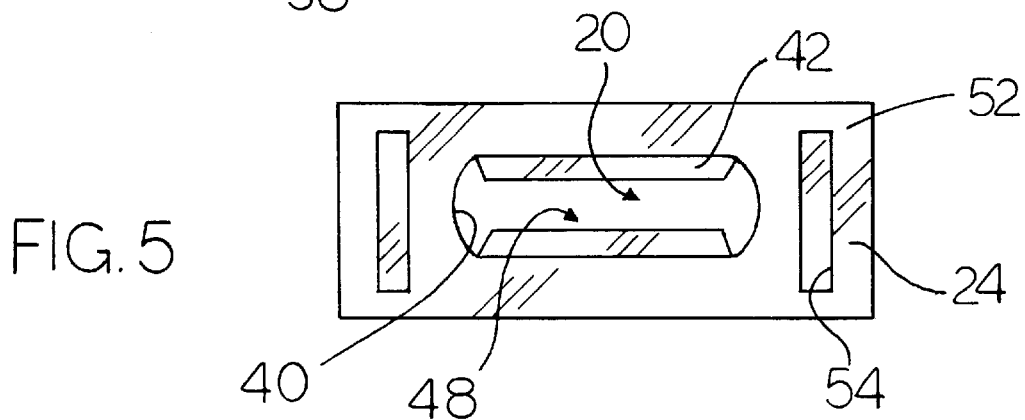
FIG. 5 is a back elevation view of the spacer of the invention.
Figure 6:
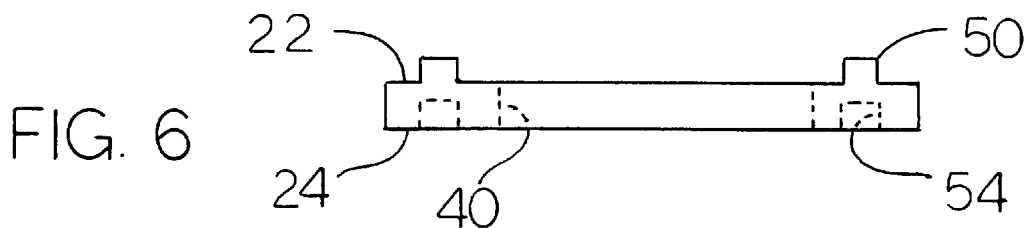
FIG. 6 is a side elevation view of the spacer of the invention.

Referring now to the drawings, the mounting spacer of the present invention is generally designated by the numeral 10.

The spacer 10 is shown in FIG. 1 in its intended use firmly screwed in position between an electrical mounting bracket 12, to which is attached an electrical outlet 14, and an electrical junction box 16. The spacer 10 includes a planar member 18 which has a hole 20 extending through the front face 22 and back face 24 of the planar member 18. The planar member 18 is preferably rectangular so that it generally conforms to the shape of the mounting ears 26 of the mounting bracket 12 and to the shape of the mounting portions 28 of the mounting plate (or trim ring) 30 of the electrical junction box 16. The planar member 18 is approximately one and three-eighths inches in width and three-eighths inches in height so that it can fit within ledge portions 32 of the mounting bracket 12 and so that it does not excessively protrude from the lateral and longitudinal edges of the mounting bracket 12 and mounting plate 30, as shown in FIG. 2. The planar member 18 is preferably also approximately three-thirtyseconds inches in thickness so that it can adequately fill a relatively small size gap 34 between the mounting portions 28 and mounting ears 26 to correct for the mismatch that results when the hole 46 in the drywall is mistakenly cut oversize for the mounting bracket 12. However, the planar member 18 may also be of other suitable shapes and sizes, if desired.

The hole 20 is provided to receive a mounting screw 36 therein when properly positioned between the mounting ears 26 and mounting portions 28 and thereby enable the mounting bracket 12 to be screwed onto the junction box 16 with the spacer 10 sandwiched therebetween. The hole 20 is preferably five-sixteenths inches in longitudinal dimension so that it can accomodate a standard size screw such as typically used in such applications. The hole 20 is also preferably laterally elongated so that the position of the spacer 10 relative to the screw 36 (and thereby relative to the mounting bracket 12 and junction box 16) can be laterally adjusted. This enables the spacer 10 to be placed in any position (within a certain range) in which it will be out of contact with ridges or other types of protruding structures on the mounting bracket 12 or mounting plate 30 and can thus be firmly positioned against the bracket 12 and plate 30. In addition, the lateral adjustment feature allows the spacer 10 to be positioned so that it is out of the way of other electrical components which may be located within the junction box 16 such as electrical wiring or component structures of the electrical device 14. The hole 20 is thus laterally dimensioned so that it is approximately five-eighths inches in width i.e. its width is approximately twice its height and its longitudinal sides are approximately parallel to each other while its lateral sides are arcuate.

The planar member 18 has longitudinal and lateral walls 38 and 40 which define the hole 20. The hole 20 is preferably provided with a tab 42 preferably mounted at a longitudinal wall 38 for engaging the threads 44 of mounting screw 36 and retaining it in its desired position. The tab 42 preferably extends longitudinally into the hole 20 and preferably extends laterally the entire length of the wall 38 in order to engage the threads 44 of the screw 36 when it is at any location within the entire width of the hole 20. This allows the tab 42 to retain the screw 36 when it is anywhere in the adjustment range provided by the hole 20. The lateral dimensions of the tab 42 are almost the same as the width of the hole 20 such that the lateral dimension of the tab 42 is approximately nine-sixteenths of an inch. There are preferably a pair of tabs 42 mounted at the longitudinal walls 38 to provide more secure retention of the screw 36. The tabs 42 are preferably one-sixteenth of an inch in longitudinal dimension and thus project outwardly from the walls 38 leaving a gap 48 between the tabs 42 of approximately three-sixteenths of an inch to accomodate a standard size mounting screw 36. The pair of tabs 42 are preferably oriented so that the longitudinal edges 58 thereof face each other such that the tabs 42 are in an opposing relationship to each other.

The planar member 18 includes posts 50 at a front face 22 thereof. The posts (or protruding members) 50 extend outwardly from the front face 22 a distance of approximately one-thirtysecond of an inch. The posts 50 are preferably rectangular in cross-section although they may be other suitable shapes as well. The posts are preferably a pair of posts 50 mounted at opposite lateral end portions 52 of the planar member 18. The posts 50 are also preferably longitudinally oriented. The posts are preferably approximately one-sixteenth of an inch by one-thirtysecond of an inch.

Figure 7:
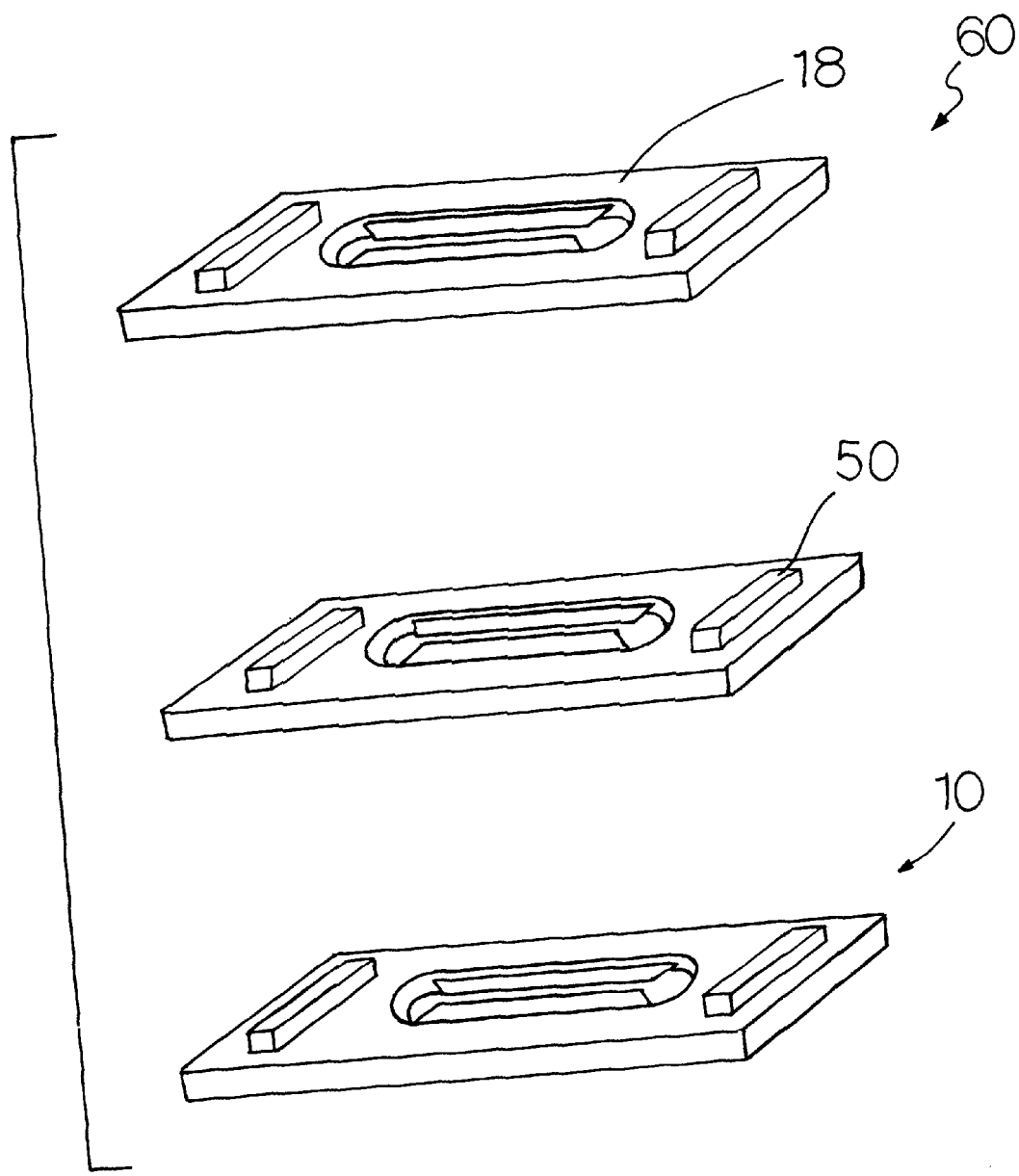
FIG. 7 is an exploded view of the invention showing it when used a collective spacer formed of individual spacers joined together in a stack arrangement.

The planar member 18 also includes receptacles 54 at a back face 24 thereof. The receptacles 54 extend inwardly from the back face 24 a distance of approximately one-thirtysecond of an inch in the planar member 18. The receptacles are preferably rectangular in cross-section although they may be other suitable shapes as well. The receptacles are preferably a pair of receptacles 54 mounted at opposite lateral end portions 52 of the planar member 18. The receptacles 54 are thus at the same location on the planar member 18 as the posts 50 but at an opposite face thereof. The receptacles 54 are also preferably longitudinally oriented. The receptacles 50 are preferably approximately one-sixteenth of an inch by one-thirtysecond of an inch. Both the receptacles 54 and the posts 50 are preferably unitary with the planar member 18. The posts 50 have centerlines which are in alignment with centerlines of the receptacles 54. This enables a plurality of planar members 18 to be joined together with front face to back face and with the posts of one received by the receptacles of another planar member 18 so that the planar members are secured together to thereby form a stack arrangement. The receptacles 50 are more exactly preferably slightly less than these dimensions to facilitate an easy fit of the posts 50 into the receptacles 54. Individual planar members 18 may thus be manually pressed together in any desired number to yield a collective spacer 60 composed of a plurality of individual spacers 10, as shown in FIG. 7. The snug fit of the posts 50 in the receptacles 54 enables the spacers 10 to be securely held together in the stack arrangement. The alignment of the posts 50 and receptacles 54 enables the holes 20 of the individual spacers 10 to be also in alignment allowing the mounting screw 36 to easily pass through the holes 20 of the entire collective spacer 60. The front face 22 and the back face 24 are preferably flat in order to conform to the typically flat mating surfaces of the mounting ears 26 and mounting portions 28.

The posts 50 at the outer front face 22 of the collective spacer 60 provide a certain degree of grip to that surface of the collective spacer 60 as well as to the spacer 10 when used individually. The posts 50 thus provide a certain degree of retention of the collective spacer 60 or spacer 10 against the adjacent surface of the mounting ears 26 or mounting portion 28 thereby enabling retention thereof without the necessity of excessive screw down force being applied thereto. This minimizes the likelihood that the collective spacer 60 or spacer 10 will be squished when the mounting bracket 12 is screwed onto the mounting plate 30. This feature is especially important when using the collective spacer 60 because the stack arrangement is more vulnerable to popping out at certain sides thereof and thereby distortion of the shape of the stack which may bring it undesirably into contact with the electrical wiring in the junction box 16 or other structures or devices therein and thereby otherwise interfere with the functions thereof.

The planar member 18 is preferably composed of an electrically insulating material such as plastic to prevent undesirable electrical conduction with electrical devices, wiring, etc. in the junction box 16. The planar member 18 is also preferably composed of a semi-resilient plastic to enable it to yield to pressure produced by the mounting screw 36 by compressing slightly thereby minimizing the likelihood of cracking thereof or of associated structures when under such pressure. The semi-resilient characteristic of the plastic material also enhances retention of the collective spacer 60 and spacer 10 between the mounting bracket 12 and junction box 16.

Accordingly, there has been provided, in accordance with the invention, a mounting spacer for mounting an electrical mounting bracket onto the mounting plate of an electrical junction box which may be easily manually adjusted in thickness thereof to accomodate the width of the gap between the bracket and the plate and which may be adjusted in position relative to the bracket and plate to correct for mismatch between the mating surfaces of the bracket and plate. It is to be understood that all the terms used herein are descriptive rather than limiting. Although the invention has been described in conjunction with the specific embodiment set forth above, many alternative embodiments, modifications and variations will be apparent to those skilled in the art in light of the disclosure set forth herein. Accordingly, it is intended to include all such alternatives, embodiments, modifications and variations that fall within the spirit and scope of the invention as set forth in the claims set forth hereinbelow.

What is claimed is:

1. A spacer for mounting an electrical mounting bracket onto an electrical junction box, comprising:
    a planar body having a front face and a back face and a hole extending therethrough the hole being laterally elongated to allow lateral adjustment of the position of the mounting screw therein and lateral adjustment of the position of the spacer relative to the electrical mounting bracket and the electrical box;
    a protruding member mounted on said front face and protruding outwardly therefrom;
    a receptacle mounted in said planar body and having an opening at said back face and extending inwardly therefrom into said planar body, said receptacle having width and depth dimensions sufficiently larger than width and height dimensions of said protruding member to allow said protruding member to snugly fit therein in order to allow a plurality of spacers to be stack mounted together between the electrical mounting bracket and the electrical box.

2. The spacer of claim 1 wherein said receptacle has a receptacle centerline perpendicular to said planar body and said protruding member has a protruding member centerline perpendicular to said planar body, said receptacle centerline and said protruding member centerline in alignment with each other.

3. The spacer of claim 1 wherein said front face and said back face are flat.

4. The spacer of claim 1 wherein said receptacle and said protruding member are located at end portions of said planar body.

5. The spacer of claim 1 wherein said planar body is composed of semi-resilient plastic in order to enhance secure positioning of the spacer between the electrical mounting bracket and the electrical box.

6. The spacer of claim 1 wherein said receptacle and said protruding member are rectangular in cross-section.

7. The spacer of claim 1 wherein said receptacle and said protruding member are unitary with said planar body.

8. A spacer for mounting an electrical mounting bracket onto an electrical box, comprising a planar body having a hole extending therethrough for receiving a mounting screw for mounting the electrical mounting bracket onto the electrical box, the hole being closed at lateral sides and longitudinal sides thereof and laterally elongated to allow lateral adjustment of the position of the mounting screw therein and lateral adjustment of the position of the spacer relative to the electrical mounting bracket and the electrical box, said planar body having walls defining the hole which are straight.

9. The spacer of claim 8 wherein the hole is approximately five-eighths of an inch in width to provide a range of lateral adjustment of positioning of the spacer relative to the bracket and the box.

10. The spacer of claim 8 wherein said walls are parallel to each other.

11. A spacer for mounting an electrical mounting bracket onto an electrical box, comprising:
    a planar body having a front face and a back face and a hole extending therethrough, the hole being laterally elongated to allow lateral adjustment of the position of the mounting screw therein and lateral adjustment of the position of the spacer relative to the electrical mounting bracket and the electrical box;
    a pair of protruding members mounted on said front face at opposite lateral end portions of said planar body and extending outwardly from said front face;
    a pair of receptacles mounted at opposite lateral end portions of said planar body, each of said pair of receptacles open at said back face and extending inwardly therefrom into said planar body, said pair of receptacles having width and depth dimensions sufficiently larger than width and height dimensions of said pair of protruding members and receptacle centerlines in alignment with protruding member centerlines of said pair of protruding members to allow said pair of protruding members to snugly fit in said pair of receptacles when a plurality of spacers are stack mounted together to accomodate spacing between the electrical mounting bracket and the electrical box.

12. The spacer of claim 11 wherein longitudinal dimensions of said planar body are approximately three-eighths inches to fit within ledge portions of a standard size electrical mounting bracket to enhance retention of the spacer in a desired position between the electrical mounting bracket and the electrical box and lateral dimensions of said planar body are approximately one and three-eighths inches to accomodate lateral dimensions of end portions of a standard size electrical mounting bracket.

13. The spacer of claim 12 further including a pair of tabs mounted on opposing walls partly defining the hole so that said pair of tabs are in an opposing relationship to each other, said pair of tabs extending entire lateral length of the hole to enable secure positioning of the spacer within entire range of lateral adjustment of the position of the screw.

14. The spacer of claim 3 wherein the hole is approximately five-sixteenths of an inch in longitudinal dimension and said pair of tabs have a gap therebetween of approximately three-sixteenths of an inch to accomodate a standard size mounting screw.

15. A spacer for mounting an electrical mounting bracket onto an electrical junction box, comprising:

- a planar body having a front face and a back face and a hole extending therethrough;
- a protruding member mounted on said front face and protruding outwardly therefrom;
- a receptacle mounted in said planar body and having an opening at said back face and extending inwardly therefrom into said planar body, said receptacle having width and depth dimensions sufficiently larger than width and height dimensions of said protruding member to allow said protruding member to snugly fit therein in order to allow a plurality of spacers to be stack mounted together between the electrical mounting bracket and the electrical box, said receptacle and said protruding member located at lateral end portions of said planar body.

16. The spacer of claim 15 wherein said lateral end portion includes a right lateral end portion and a left lateral end portion and wherein said receptacle includes a left receptacle mounted at said left lateral end portion and a right receptacle mounted at said right lateral end portion and wherein said protruding member includes a left protruding member mounted at said left lateral end portion and a right protruding member mounted at said right lateral end portion.

17. A spacer for mounting an electrical mounting bracket onto an electrical box, comprising:

- a planar body having a hole extending therethrough for receiving a mounting screw for mounting the electrical mounting bracket onto the electrical box, the hole being laterally elongated to allow lateral adjustment of the position of the mounting screw therein and lateral adjustment of the position of the spacer relative to the electrical mounting bracket and the electrical box; and
- a tab mounted on a wall partly defining the hole and extending inwardly therefrom for engaging threads of the mounting screw to provide secure positioning of the spacer between the electrical mounting bracket and the electrical box.

18. The spacer of claim 17 wherein said tab extends the lateral length of the hole to enable secure positioning of the spacer within entire range of lateral adjustment of the positioning of the spacer.

19. The spacer of claim 17 wherein said tab includes a pair of tabs mounted on opposing walls partly defining the hole so that said pair of tabs are in an opposing relationship to each other.

20. The spacer of claim 19 wherein the hole is approximately five-sixteenths of an inch in longitudinal dimension and said pair of tabs have a gap therebetween of approximately three-sixteenths of an inch to accomodate a standard size mounting screw.

* * * * *